United States Patent Office 2,820,728
Patented Jan. 21, 1958

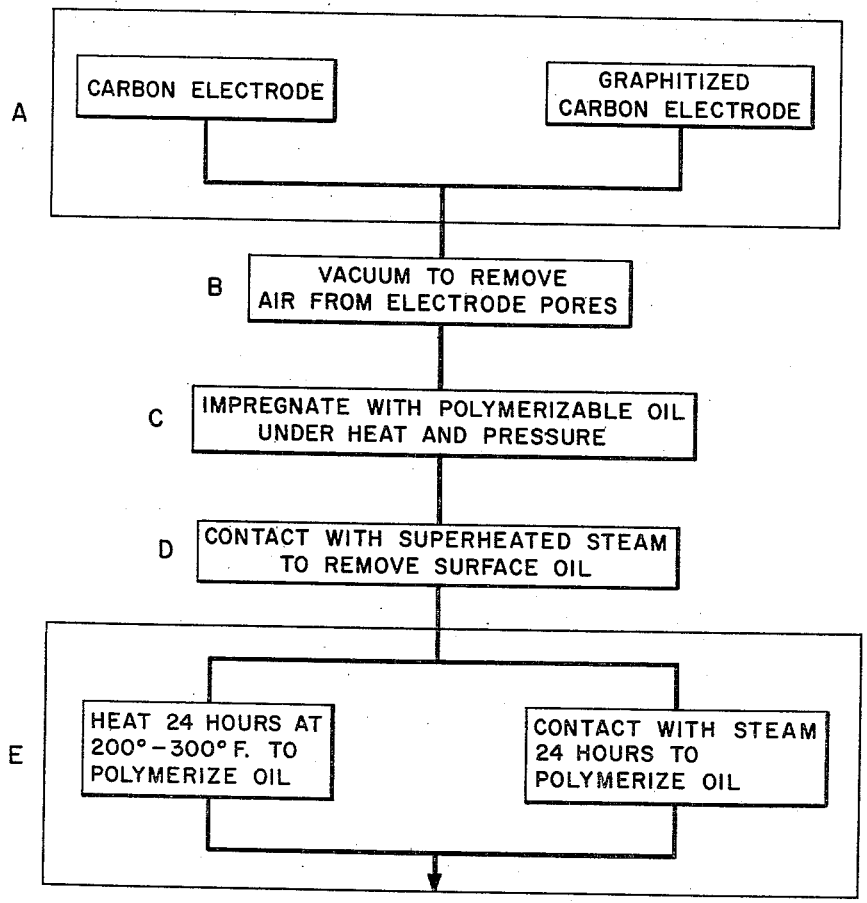

2,820,728
METHOD OF TREATING CARBON ELECTRODES WITH POLYMERIZABLE OIL

John C. Burns, Jr., Pasadena, Tex., assignor to Diamond Alkali Company, Cleveland, Ohio, a corporation of Delaware Application June 21, 1955, Serial No. 517,079

8 Claims. (Cl. 117—228)

This invention relates to improvements in electrolytic cells, and more particularly is concerned with the treatment of polymerizable oil-containing carbon electrodes for use in chlorine-alkali type electrolytic cells.

Various methods have heretofore been proposed to increase the durability and useful life of carbon electrodes in electrolytic cells. Typical of such a prior suggestion is the impregnation of a carbon electrode with a drying oil, which oil then is allowed to dry or harden in situ. In some instances, such treatment indeed is advantageous in providing a more durable electrolyte-resistant electrode. Occasionally, however, such treatment has led to difficulties in the operation of an electrolytic cell when a thus-treated electrode is first placed in use. Since the drying oil in the electrode dries or hardens rather slowly and non-uniformly, far too frequently the oil is only partially hardened or dried when the electrode is placed in service. As a result, there occurs a leaching out of the partially-cured oil and, in the case of a chlorine-alkali cell employing such an electrode as an anode, a subsequent chlorination of the oil. While this chlorination not only reduces the chlorine output of the cell and introduces undesired by-products, an additional problem is involved, since the finely-divided chlorinated oil is deposited over the cell diaphragm, thus rapidly reducing the fluid flow therethrough and generally completely plugging the diaphragm in a short time. A further inherent problem in such chlorination is the formation of by-product HCl in the anolyte, which HCl, of course, undesirably reduces the pH of the anolyte.

Prior workers in the art have sought a method to overcome these difficulties and various treatments have been proposed to eliminate or minimize these problems. Illustrative of prior suggestions and practice to improve the operating characteristics of impregnated carbon electrodes is the storage of freshly-impregnated anodes for a considerable period of time to allow gradual hardening and solidification of the oil within the anode pores, or the use of a special conditioning electrolytic cell in which the unpolymerized oil is leached from the electrode prior to use in a commercial cell. However, so far as is known, up to the present time no completely satisfactory solution to the problem had been discovered.

It is, therefore, a principal object of this invention to avoid the difficulties heretofore encountered in the operation of electrolytic cells and to provide a new and improved electrode treatment.

A further object of this invention is the provision of new and improved carbon electrodes for use in electrolytic cells.

A still further object of the invention is to provide new and improved carbon electrodes impregnated with a polymerizable oil, which electrodes do not interfere with the normal operation of an electrolytic cell.

In the accompanying drawing, the figure shows the steps of the method according to the invention.

In accordance with the present invention, a carbon electrode is contacted with a polymerizable oil and thereafter heat bodied, or polymerized at a greatly accelerated rate, in a manner adequate to accomplish substantially complete polymerization under non-oxidative conditions.

More particularly, the present invention comprises treating a carbon electrode by contacting it with a polymerizable oil and then effecting substantially complete polymerization at an elevated temperature low enough to preclude disruption of polymerization bonds formed as the oil polymerizes in situ within the carbon electrode. Such heating preferably is conducted under non-oxidizing conditions, e. g., in the absence of air.

It will be appreciated that this invention does not contemplate a high-temperature treatment of impregnated electrodes, e. g., 390° F. or higher. On the contrary, the present discovery has been made that new and unexpected results are obtained when a polymerization oil-impregnated electrode is subjected to a temperature lower than 400° F., preferably within the range from 200°–300° F., for an extended period, typically about 24 hours.

In the drawing, the rectangles lettered A, B, C, D, and E represent the successive steps of the method, rectangles B, C, and D representing steps which are always used, the smaller blocks inside rectangles A and E representing alternatives for carrying out the first and last steps.

In the practice of this invention it has been found that excellent results are obtained when a carbon electrode, typically a carbon anode as used in a chlor-alkali diaphragm cell, is impregnated with a polymerizable oil, such as the presently preferred linseed oil, tung oil, perilla oil, fish oil, safflower oil, soybean oil, oiticica oil, or dehydrated castor oil.

Other oils which in many applications may be employed in lieu of, or in admixture with, the foregoing oils, either wholly or in part, are coconut oil, palm kernel oil, babassu oil, murumuru oil, palm oil, rape seed oil, mustard seed oil, olive oil, peanut oil, sesame oil, corn oil, cottonseed oil, soybean oil, sunflower oil, walnut oil, whale oil, menhaden oil, sardine oil, and herring oil. These oils, as well as those mentioned in the preceding paragraph, may be employed with or without a catalyst, e. g., a cobalt compound, such as cobalt naphthenate, although it is generally preferable to use a catalyst.

The thus-treated electrode, generally containing 8 to 10% by weight of the oil, preferably 6.5 to 9.5% linseed oil, then is exposed to an elevated temperature less than about 400° F., preferably 250° F. using linseed oil, either by placing it in a furnace or oven maintained at such a temperature, or by exposing the oil-containing electrode to direct contact with steam for a period of time sufficient to accomplish the desired results.

One qualitative test known to the art as indicative of the condition of a drying oil in the electrode and useful in the practice of this invention is the so-called "smoke-test." This test involves heating an oil-impregnated electrode to a temperature at which the oil smokes. If no oil exudes from the electrode at this temperature, it is generally considered that the electrode is suitable for use in an electrolytic cell.

While details vary somewhat in commercial production of carbon anodes, generally finely-divided coke is mixed with the desired proportions of a binder, usually a coal tar residue pitch. This mixing generally is carried out at an elevated temperature sufficient to melt the binder. The resultant mixture is then extruded and the thus-formed structures baked, typically at a temperature of about 1800° F., to remove volatile matter. Anodes produced in the foregoing manner may then advantageously be impregnated with a drying oil in accordance with this invention.

Superior results are obtained in most instances, however, when, prior to impregnation with a drying oil, the anode is "graphitized," i. e., the carbon crystal structure is converted to the graphitic crystal structure by heating one or more times to a temperature in the range from 4150°–5000° F. At times, either a baked anode or graphitized anode can be further treated with pitch when it is desired further to improve the anode density and strength.

Impregnation of the carbon anode with a drying oil can be accomplished in any conventional way, as by placing the anodes under vacuum and immersing the anodes while under vacuum into the desired impregnant. Illustrative of one specific method for impregnating a carbon anode is the following:

EXAMPLE I

Part A

A graphitized carbon anode is placed into an autoclave and a 28″ Hg vacuum applied for 15 minutes to remove air from the anode pores. Linseed oil, heated to a temperature of 250° F., is then drawn into the autoclave and a pressure of 90 p. s. i. g. is applied for one hour. The excess linseed oil is then forced back into its heating tank and the anode surface is contacted eight times with superheated steam (300° F.) to remove surface retained oil.

Part B

The anode treated in accordance with Part A is heated to a temperature between 200°–300° F. for 24 hours to effect substantially complete polymerization of the linseed oil in situ.

EXAMPLE II

Since a reduction in anolyte pH reflects the amount of HCl produced on chlorination of oil leached from an anode in a chlorine-alkali cell, anolyte pH measurements represent an extremely effective means of demonstrating the practice of this invention. Accordingly, there are comparatively indexed below experimental data obtained by subjecting samples cut from the same linseed oil-impregnated commercially available carbon anode to differing heat treatments and employing such samples as anodes in chlorine-alkali electrolytic diaphragm cells:

| Sample | Heat treatment (non-oxidizing conditions) | pH at varying times after cell put in operation | | |
|---|---|---|---|---|
| | | 1 hr. | 2 hrs. | 3 hrs. |
| 1 | None | 2.3 | 1.45 | 1.15 |
| 2 | 200° F., 24 hrs | 4.1 | 3.7 | |
| 3 | 300° F., 24 hrs | 4.4 | 3.8 | 3.65 |
| 4 | 400° F., 24 hrs | 4.1 | 3.95 | 3.0 |
| 5 | 500° F., 24 hrs | 4.25 | 3.3 | 2.65 |
| 6 | Unimpregnated—no heat treatment | 4.4 | 3.7 | 3.2 |

As the foregoing data indicates, a 200°–300° F. heat treatment for 24 hours in the absence of air results in only a slightly reduced anolyte pH even better than is obtained using an unimpregnated anode. On the other hand, a treatment, even under non-oxidizing conditions, at a temperature of 400° F. or higher causes a marked decrease in anolyte pH, thus reflecting a deterioration of the polymerized oil.

EXAMPLE III

Experiments similar to those set forth in Example I are conducted by heating oil-impregnated anodes at differing conditions in air. The data from such experiments is as follows:

| Sample | Heat treatment | | First run anode life |
|---|---|---|---|
| | Time (hrs.) | Temp. (° F.) | |
| 1 | 4 | 400 | 3 hrs. |
| 2 | 6 | 400 | 7 days |
| 3 | 8 | 400 | 2 days |
| 4 | 12 | 500 | 2 days |

EXAMPLE IV

A carbon anode treated in accordance with Example I, Part A, is contacted with steam for 24 hours to effect a rapidly accelerated polymerization of the oil within the anode pores.

As the foregoing figures indicate, a heat treatment, even for a relatively short time, does not prevent early anode failure.

The expression "polymerizable oil" as used in the specification and claims is intended to include various fats and oils which will polymerize to form a hard resinous mass. In practice, either raw or bodied oils may be employed.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of treating a carbon electrode which comprises contacting said electrode with a polymerizable oil and effecting polymerization of said oil in situ under substantially non-oxidative conditions with the aid of heat at an elevated temperature low enough to preclude disruption of polymerization bonds formed as the oil polymerizes.

2. The method of treating a carbon electrode which comprises impregnating said electrode with a polymerizable oil and heating the thus-impregnated electrode under substantially non-oxidative conditions to an elevated temperature less than 400° F. for a period of time sufficient to allow substantially complete polymerization of the oil.

3. In the treatment of a carbon electrode for use in an electrolytic cell, the improvement which comprises impregnating said electrode with a polymerizable oil and heating the thus-treated electrode under substantially non-oxidative conditions to an elevated temperature lower than 400° F. for a period of time sufficient to preclude subsequent exudation of the oil when said electrodes are placed in service in an electrolytic cell.

4. The method according to claim 3 wherein the polymerizable oil is linseed oil.

5. The method according to claim 3 wherein the polymerizable oil contains a catalyst.

6. The method of treating a carbon electrode which comprises contacting said electrode with a polymerizable oil and subjecting the thus-treated electrode to direct contact with steam for a period of time sufficient to allow substantially complete polymerization of the oil and to preclude exudation of the oil from said electrode when it is employed in the operation of an electrolytic cell.

7. The method of treating a carbon electrode which has been impregnated with a polymerizable oil, which method comprises heating said electrode under non-oxidative conditions to a temperature within the range from 200°–300° F. for a period of time sufficient to cause substantially complete polymerization of the oil.

8. The method of treating a carbon electrode which comprises impregnating said electrode with a polymerizable oil and thereafter effecting polymerization of said oil in situ by heating the thus-treated electrode to a temperature within the range from 200°–300° F. for about 24 hours.

References Cited in the file of this patent

UNITED STATES PATENTS

| 949,671 | Baekeland | Feb. 15, 1910 |
| 1,861,415 | Hunter et al. | May 31, 1932 |
| 2,146,099 | De Boer et al. | Feb. 7, 1939 |
| 2,204,252 | Krenzien | June 11, 1940 |
| 2,304,087 | Harper et al. | Dec. 8, 1942 |
| 2,368,306 | Kiefer et al. | Jan. 30, 1945 |